United States Patent
Andrews et al.

(10) Patent No.: US 7,154,530 B2
(45) Date of Patent: Dec. 26, 2006

(54) SYSTEM FOR CUTTING SHAPES PRESET IN A CONTINUOUS STREAM OF SHEET MATERIAL

(75) Inventors: Randall G. Andrews, Edmonton (CA); Mary M. Bourke, Edmonton (CA); Brian D. Sawatzky, Edmonton (CA); Andrew Z. Reif, Edmonton (CA); Brad Johnston, Edmonton (CA); Cedar Mah, Edmonton (CA)

(73) Assignee: Lacent Technologies Inc., Edmonton (CA)

( * ) Notice: Subject to any disclaimer, the term of this patent is extended or adjusted under 35 U.S.C. 154(b) by 740 days.

(21) Appl. No.: 10/315,008

(22) Filed: Dec. 10, 2002

(65) Prior Publication Data

US 2003/0118229 A1 Jun. 26, 2003

Related U.S. Application Data

(60) Provisional application No. 60/337,151, filed on Dec. 10, 2001.

(51) Int. Cl.
*H04N 9/47* (2006.01)
*B23K 26/14* (2006.01)

(52) U.S. Cl. .................... 348/86; 219/121.67
(58) Field of Classification Search ............ 348/86–88, 348/94–95; 700/259; 219/121.67; 356/237.1
See application file for complete search history.

(56) References Cited

U.S. PATENT DOCUMENTS

| | | | |
|---|---|---|---|
| 4,853,866 A | 8/1989 | Andrada Galan et al. | |
| 4,905,159 A | 2/1990 | Loriot | |
| 4,961,149 A | 10/1990 | Schneider et al. | |
| 5,023,917 A * | 6/1991 | Bose et al. .............. | 382/149 |
| 5,172,326 A | 12/1992 | Campbell, Jr. et al. | |
| 5,333,111 A | 7/1994 | Chaiken et al. | |
| 5,353,355 A | 10/1994 | Takagi et al. | |
| 5,508,936 A | 4/1996 | King et al. | |
| 5,791,215 A | 8/1998 | Morrison et al. | |
| 5,975,743 A | 11/1999 | Bercaits | |
| 6,294,755 B1 * | 9/2001 | Sawatzky et al. ...... | 219/121.72 |
| 6,681,151 B1 * | 1/2004 | Weinzimmer et al. ...... | 700/259 |
| 6,954,681 B1 * | 10/2005 | Fisher et al. ................ | 700/259 |

FOREIGN PATENT DOCUMENTS

CA 2016554 11/1991

* cited by examiner

*Primary Examiner*—Gims Philippe
(74) *Attorney, Agent, or Firm*—Sean W Goodwin

(57) ABSTRACT

Method and apparatus enable cutting out shapes (S) preset in moving sheet material (10) by locating coordinates of one or more fiducials (F,F2 . . . ) in the sheet material (10) with a vision system (12). The fiducials (F,F2 . . . ) correspond to a pattern (P) for the preset shape (S). A cutting system (11) superimposes the pattern (P) relative to the located one or more fiducials (F,F2 . . . ) for cutting out the preset shape (S) while the vision system (12) is concurrently locating subsequent one or more fiducials (F,F2 . . . ) in the moving sheet material (10). The concurrent processes of cutting and locating subsequent fiducials (F,F2 . . . ) are repeated substantially continuously. Preferably, using two or more fiducials (F,F2 . . . ), distortion is detected and the pattern (P) can be remapped before cutting for accurate superposition of the pattern (P) and distorted preset shape (S).

25 Claims, 14 Drawing Sheets

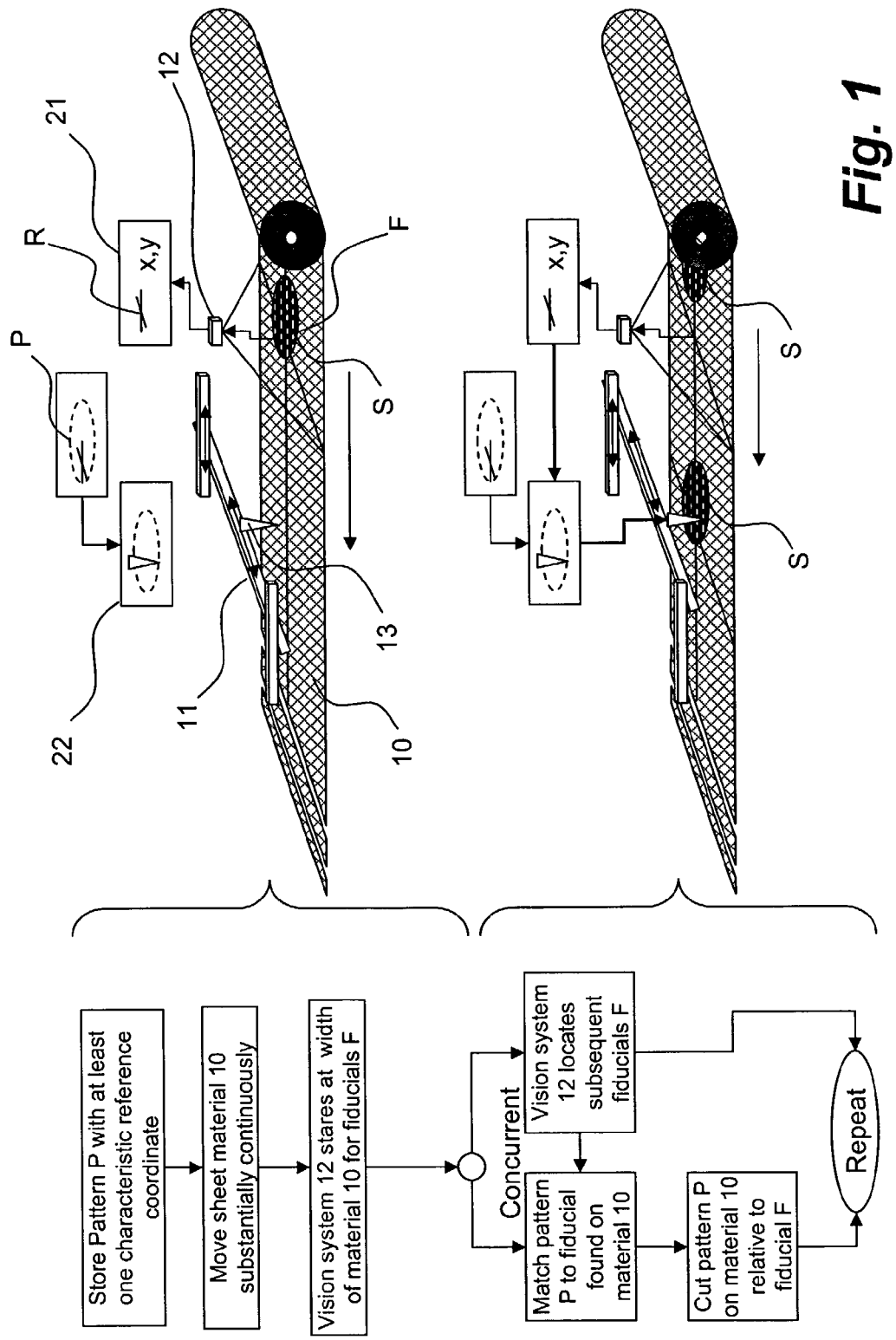

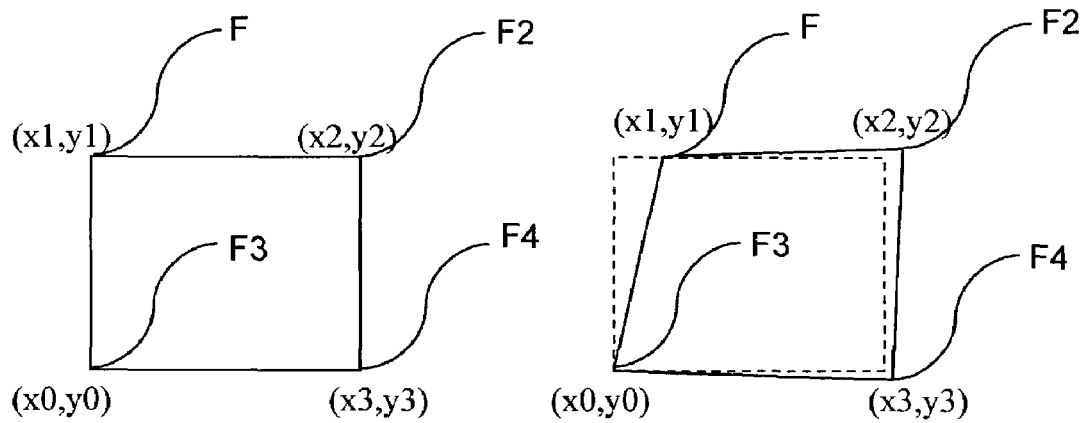
Fig. 9c  Fig. 9d
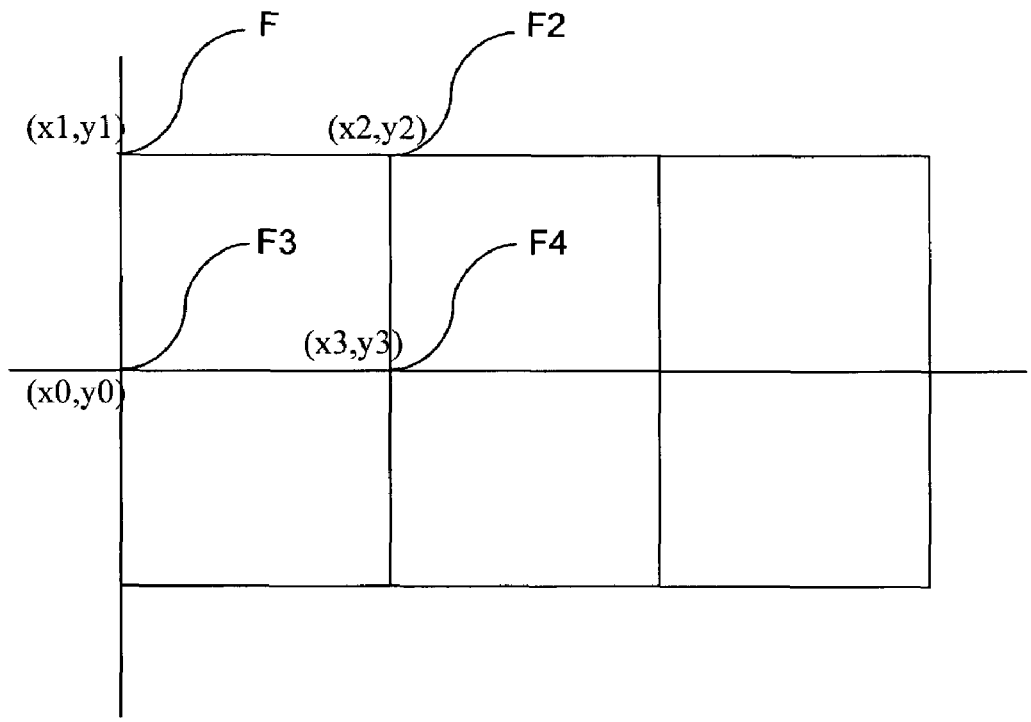
Fig. 9b

SYSTEM FOR CUTTING SHAPES PRESET IN A CONTINUOUS STREAM OF SHEET MATERIAL

CROSS-REFERENCE TO A RELATED APPLICATION

This application is a regular application of U.S. Provisional Patent Application Ser. No. 60/337,151 filed on Dec. 10, 2001, the entirety of which is incorporated herein by reference for all purposes.

FIELD OF THE INVENTION

The invention relates to vision and cutting apparatus for cutting shapes preset in a moving sheet of material. In particular, a vision system recognizes fiducials associated preset shapes of known geometry and a controller instructs the cutting system to accurately cut the geometry of the shape as the material passes thereby.

BACKGROUND OF THE INVENTION

A known method is to advance a finite length of featureless material into a cutting zone, and while the material is stationary, moving a laser beam about on a X-Y positioner for cutting a pattern from the material. A numerically-controlled positioner positions the laser beam over the material in response to a predetermined known pattern. Once the pattern is cut the conveyor advances to eject the cut pattern and bring new material into the cutting zone.

In Canadian Patent Application published as 2,016,554 in Nov. 11, 1991, a method is disclosed which partially achieves the objective of increasing the throughput of cut patterns by enabling laser cutting while material is moving on a conveyor in a continuous manner through a laser cutting zone. This "Cut-on-the-Fly" method eliminates the loading and unloading of material from the cutting zone and it employs efficient movement of the laser cutting head both along the axis of the moving material as well as across the material. In U.S. Pat. No. 6,294,755 B1, issued Sep. 25, 2001 to Lacent Technologies Inc., of Edmonton, Alberta, CANADA, it is disclosed to further optimize and increase the throughput of cut material by minimizing the time required to move the laser along a continuous path by discretizing the path into geometric moves, pairs of which are joined to minimize positioner stop and go. Further, ranges of velocities are analyzed for each discrete move and are adjusted to overlap for fitting a continuous velocity curve therethrough.

The above techniques have been based upon a substantially uniform material and the pattern exists only in the cutter's numeric storage. In other words, the pattern can be implemented anywhere on the continuously moving material. However, in certain instances it is desirable to locate and cut out a shape which is already printed or otherwise preset in the material. There are a number of challenges involved in cutting out shapes or patterns whose coordinates in the materials are invariant including: locating where to start cutting and cutting along the shape's predetermined cut lines or within a certain tolerance thereof. The above challenges are worsened in the situations where the material is moving continuously, where the material may skew from the start of cutting to the end of cutting.

It is known in the clothing and furniture industry to cut patterned materials for later assembly. In such instances, a finite number of starting positions are known. An example of such technology is as set forth in U.S. Pat. No. 5,975,743 to Bercaits and U.S. Pat. No. 4,905,159 to Loriot. It is known in the art to use a vision system which may be utilized to locate a starting point, however, to date the camera of such vision systems are carried by the cutter and therefore can only be applied serially; to seek within a carefully defined area for locating the start point, and then resetting to begin the cutting process. Another approach to cutting out the shape is to pre-mark boundaries or cut lines of the shape with identifying markers, then to trace the marker with a cutter. To applicant's knowledge, the cutting of preset shapes from a moving sheet of material has not been achieved in a satisfactory manner.

Applicant has not found the abovementioned technologies provide increased accuracy, higher throughput and operation with more sophisticated materials.

SUMMARY OF THE INVENTION

In some instances it is desirable to cut out shapes that are preset into sheet material. It is the nature of sheet material that a preset shape can distort, either as a result of the manufacturing process, such as a weaving process, or during subsequent handling. The nature and extent of the distortion can vary along the length of the shape and along the length of the sheet material. Thus, the shape is only expected to have a predetermined pattern at a particular relative position in the sheet material. Further, to speed the process, the material can be moved continuously through a cutting system. Prior art approaches are well known to cut a known pattern anywhere from a blank piece of material. For shapes preset in material however, one must cut out a pattern at the corresponding and preset coordinates corresponding to the shape on the sheet material.

In one embodiment, a vision system is adapted to a cut-on-the-fly cutting system in which the cutting system is concurrently cutting out shapes based on a previously located fiducial while the vision system looks at or scans the sheet material passing thereby for locating one or more subsequent fiducials in the material associated with at least one shape, whether it be the same shape or other shapes. Each shape is preset in sheet material and is associated with a known geometry or pattern and a fiducial. The fiducials are known in a global coordinate system such as that associated with the cutting system. The known pattern is cut relative to the coordinates of the fiducial for the corresponding preset shape in the sheet materials as it passes therethrough. Similarly, the vision system and cut-on-the-fly cutting system can be moved sequentially and substantially continuously over a fixed bed of sheet material.

To match the cutting pattern with the actual location of each preset shape, and in one embodiment, a stationary vision system looks at sheet material moving thereunder for locating a first fiducial, and when found, determines its global coordinates relative to the cutting system. A controller determines the location of the pattern relative to this first fiducial for superposition therewith. Accordingly, preset shapes which appear at non-regular intervals in the sheet material or which are shifted in coordinates X or in Y can be cut as readily as those in the prior art which are not fixed in the material at all or which appear predictably at predetermined intervals.

Concurrently, while the vision system continues to locate subsequent fiducials, the cutting system cuts out preset shapes corresponding with the earlier located or previous fiducials.

In other cases, at least a second fiducial for a shape, or each shape, is provided in the material. The vision system scans the material within its field of view for a first fiducial and additional fiducials, and when each is found, the system determines their global coordinates. The controller expects that the second or greater number of fiducials should be found at a given incremental coordinates from the first fiducial, based upon the shape's known geometry or pattern. The pattern is adjusted to account for any apparent distortion in the sheet material and the shape. One adjustment can include a linear stretch to account for either a shorter shape or a longer shape than the predetermined geometry in the pattern. Another form of adjustment includes that which adjusts for shapes in the sheet material which are rotated (material skewed) and shapes which are distorted within the shape itself (material is bowed and skewed).

In another embodiment, efficiency is maintained or increased by changing cutting instructions on-the-fly. Such a situation includes remapping patterns to account for distortion or for modifying, omitting or skipping over cutting one of multiple preset shapes in a nest of shapes in the sheet material. One can skip over a preset shape occupying a flawed or otherwise defective piece of material. A particular fiducial could flag the flawed preset shape. Between the vision system and the cutting system, the cut path and motion profiles for the conveyor and laser cutter positioner can be optimized to minimize dry haul, to minimize the number of moves, to recalculate the cut path in the cutter's bite and to skip pr otherwise modify out the flawed shape, saving significant positioner time.

Real-time calculations for cut line path and motion control may be performed depending on the circumstance. In a direct application of the known geometry or pattern to the shapes in the material, a "cookie cutter" case, the pattern can be simply applied by superposition of the pattern relative to the preset shape's identified fiducial and then cut the sheet material. In such a circumstance, one can choose to use a predetermined cut path and predetermined profile for motion control of the positioner and the conveyor for the sheet material. In another circumstance, where at least two fiducials are located for a shape, then a rotation or a stretch is determinable and the shape's coordinates can be remapped to the new pattern without affecting the cut line path. Typically, the motion profile is recalculated. In other circumstances, such as where an extreme case of bow and skew has been detected through the use of a plurality of fiducials, then the cut line path may no longer be optimized prompting an adjustment of the cut path and the motion profile.

Accordingly, in a broad aspect, a method is provided for cutting out at least one shape preset in sheet material, each of the at least one preset shapes having a pattern with predetermined geometry and having at least one fiducial, each of the at least one fiducials being associated with predetermined coordinates in the pattern, comprising: locating one or more previous fiducials in sheet material moving relative to a vision system and a cutting system; cutting the preset shapes based on the one or more previous fiducials while concurrently locating one or more subsequent fiducials in the moving sheet material; and substantially continuously repeating the concurrent processes of cutting and locating the one or more subsequent fiducials.

In a broad apparatus aspect the method above can be implemented using apparatus comprising: a cut on-the-fly cutting system for cutting a pattern in the sheet material, the cutting system being known in global coordinates; a vision system for locating global coordinates of at least one fiducial in the sheet material which correspond with predetermined coordinates in the pattern; structure for effecting relative movement substantially continuously between the sheet material and the vision and cutting systems; means for establishing measures of said relative movement in global coordinates; and a controller for superimposing the pattern with the located at least first fiducial, so that the cutting system cuts the pattern for the preset shape substantially concurrently while the vision system locates global coordinates of subsequent at least one fiducial in the sheet material.

The apparatus and methodology disclosed herein are applicable to any tool which may be moved quickly about a predefined shape. The shape in the material may be integrated into the material or placed onto the material. References herein to "into" and "onto" are synonymous and one or the other is used singly to avoid repeating each embodiment at each instance but are not intended to be limiting to one or the other. One example of "into" is to substitute or include or add marker threads into the sheet material. One example of onto is to print a marker onto the surface of the material; such a marker providing discriminating feedback to the vision's system including contrast, magnetic and radioisotope.

BRIEF DESCRIPTION OF THE DRAWINGS

FIG. 1 is a flow chart and corresponding schematic drawings of one embodiment of a system for cutting preset shapes from moving sheet material;

FIGS. 9b–9d are plan views according to FIG. 9a showing rectangular patches associated with four fiducials wherein FIG. 9b shows a plurality of rectangular patches, FIG. 9c shows a single rectangular patch and FIG. 9d shows a skewed rectangular patch;

DETAILED DESCRIPTION OF THE PREFERRED EMBODIMENT

Prior art exists for cutting known patterns out of blank sheet material. With reference to the schematics for a novel system of FIG. 1, where a shape S has already been printed, woven, or otherwise preset into material 10, the shape must first be located before being cut out with a cutting system 11. The preset shape S has a pattern P having predetermined geometry. The pattern P of each shape's geometry is known in advance and is stored. Accurate superposition of the application of the pattern to the shape S in the material can be critical to the integrity and acceptability of the final cut shape S. The preset shape S is identified in the sheet material 10 using a vision system 12 which recognizes one or more characteristics markers or fiducials F for the material 10. The location of the fiducials F establishes the geometric relationship between the preset shape S and the pattern P. The locations at any time of the cutting system, the vision system and the sheet material are known in a global coordinate system. Accordingly, the location to which the cutting pattern P is applied to and cut from the sheet material is then known relative to the recognized fiducial F. A cutter 13 of the cutting system 11 cuts the sheet material 10 along the predetermined pattern P, located accurately and thus superimposed over the preset shape S on the sheet material. Concurrently, as the cutter is cutting shapes based on previously located fiducials, further and subsequent fiducials are located with the vision system.

Figure 2A:
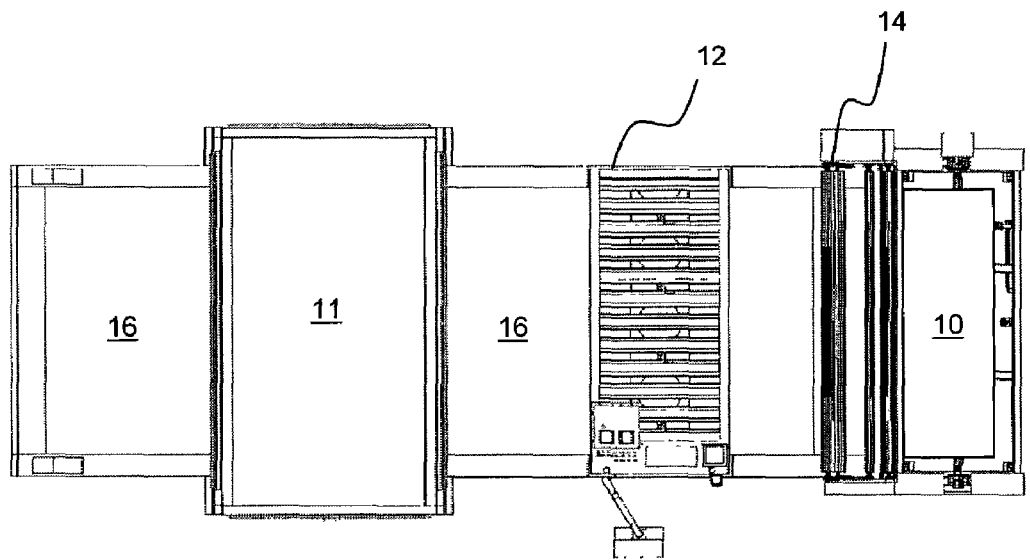
FIGS. 2a, 2b are a top view and side view respectively of a vision system incorporated with a laser cutter cutting system.
Figure 2B:
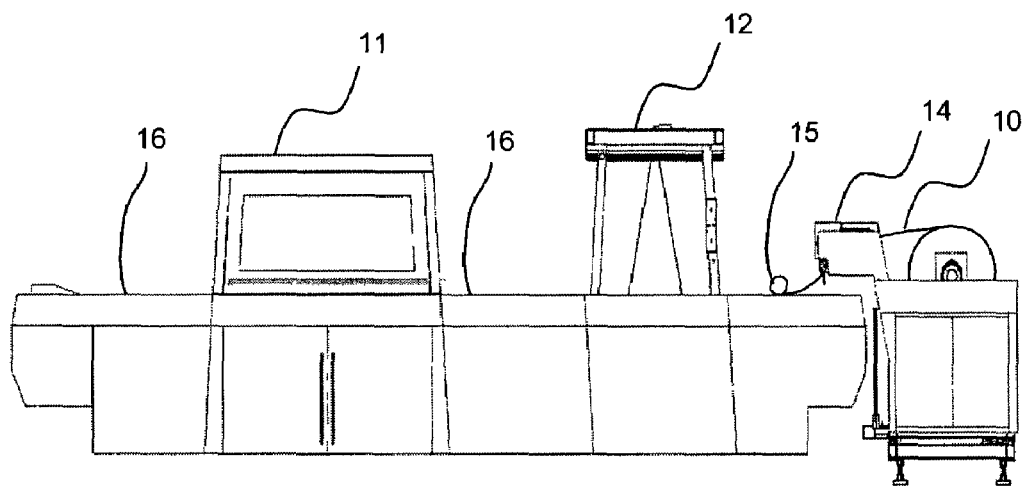

With reference also to FIGS. 2a, 2b, embodiments of the cutting system 11 include those set forth in CA published application U.S. Pat. No. 2,016,544 to Bailik and in issued patent U.S. Pat. No. 6,294,755 to Sawatzky et al., the entirety of which are incorporated herein by reference. As shown, an embodiment of the cutting system 11 is illustrated which comprises a material spreader 14 feeding sheet material past a pinch roller 15 and onto a endless conveyor 16. The conveyor 16 supports and conveys the material 10 substantially continuously through the cutting system 11. Cut material is transferred onto a stacker or other collection system (not shown). The reality of such mechanical apparatus and variability in sheet material is that one must establish the location of a preset shape in the material before cutting and even if known, the geometry of the preset shapes are sometimes but not always in perfect correspondence with the predetermined geometry for the shape's pattern P.

Equally applicable is a system in which the vision system and cutting system are moved sequentially and substantially continuously over a sheet of material. The efficiency of the system is obtained by cutting on-the-fly having relative substantially continuous relative movement whether the material move past the vision and cutting system or the vision and cutting systems are moved past the material. Herein, and associated with particular apparatus described herein, the sheet material is described as being moved sequentially past the vision and cutting systems.

Fiducials F may be located anywhere transversely across the expanse of the material 10. To avoid the associated lost of efficiency and compromises in accuracy by moving around the material seeking fiducials, the vision system 12 is stationary and looks at, stares or scans a longitudinal increment of substantially the entire transverse width of the moving sheet material 10 passing thereby. An effective width of the sheet material includes that incorporating fiducials. If the transverse location of one or more fiducials is known, then one or more transverse portions or region of interests can be defined and monitored for reducing recognition processing overhead.

Some methodologies for detecting fiducials F include processing images of the material and seeking differential contrast between say, a dark crosshair fiducial and a lighter intensity background. Other methods include the application and detection of fiducials through magnetic, electromagnetic radiation spectrum (visible or invisible), and radioisotopes. Other types of fiducial markers include sensor threads located in the material which are detected using capacitance, passive systems measuring variations in magnetic field, or active "time domain" detectors measuring secondary magnetic field from induced eddy current. As can be seen from some of the examples above, fiducials F may be placed on the surface of the material. Note that herein fiducials may be described as being in or on the sheet material and neither is meant to be limiting. As long as a fiducial is identifiable, it is not important whether the fiducial is applied by some surface application technique or incorporated somehow into the sheet material.

Herein the label of vision system is to be interpreted broadly as any system which detects fiducials F in or on the sheet of material 10. Simple vision based systems include digital cameras and lens for capturing overlapping and wide fields of view and scanners. Where the vision system applies a sequential scan of the effective width of the sheet material, the scan time and processing time are compensated for in determining the global coordinates of any identified fiducials in the moving material. For convenience however, and solely to aid in the description, the vision system 12 is described herein as a conventional light and camera system distinguishing contrast between the sheet material and marker threads in the sheet material. Such a system substantially simultaneously processes the transverse width of the sheet material. For the identification of fiducials, the terms to look, scan and detect are used synonymously herein.

Figure 3:
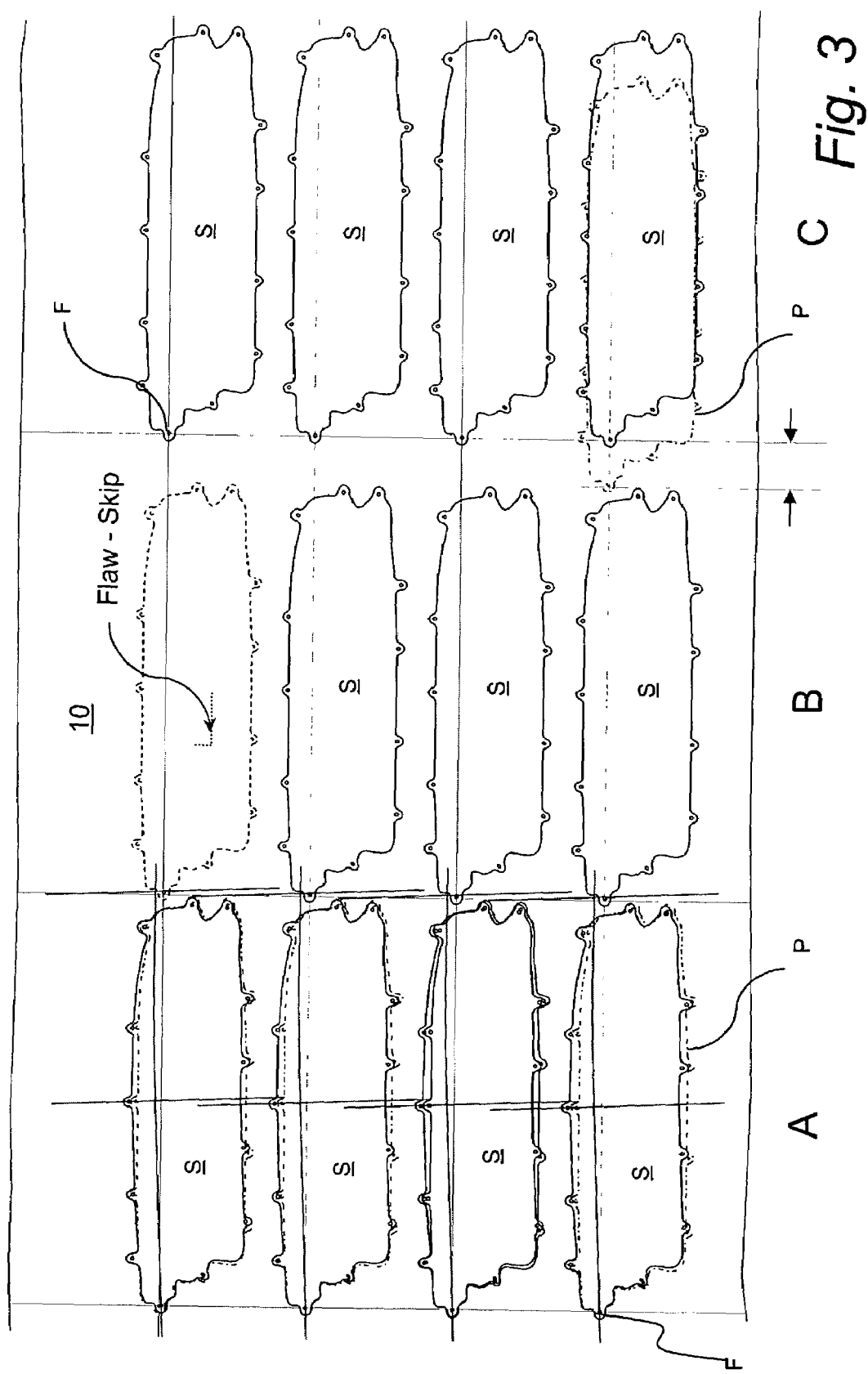
FIG. 3 is a plan view of preset shapes nested in sheet material and which illustrate a variety of problems in exaggerated depiction.

With reference to FIG. 3, sheet material 10 typically has a plurality of shapes S preset therein including machine-identifiable fiducials F. The fiducials F are distinguishable from the background of the sheet material 10 such having as discrete "marker thread or threads" having identifiable characteristics woven in the warp (typically along the direction of movement) and weft (typically transverse) direction of woven material. One type of sheet material 10 in which accurate cutting is advantageous is a material having a particular design and where the shape's pattern is positioned on the material dependent upon the design in the material. Another example of type of preset shape in material is a one piece woven fabric consisting of two layers of fabric joined together at discrete points. The shape S may be related to the discrete points, including part or all of shape's internal and external boundaries or allocation of tolerances thereabout. The apparatus and methodology herein enables accurate cutting of each shape S so as to avoid impinging on a boundary, typically having a tolerance; else the preset shape S may not survive the cutting or a subsequent quality control process.

It is to be understood that the preset shape S may not be physically marked on the sheet material 10, but that its geometry and a characteristic point is known relative to the one or more fiducials. Further, whether marked or not, the preset shape S is that corresponding to a predetermined pattern P and when applied and cut from material may include a tolerance, such as a seam allowance.

A nest of a plurality of shapes S are illustrated in FIG. 3, at least some of which are preset shapes S placed into the material 10. The nest itself can constitute a preset shape S having a pattern P which is merely more comprehensive than a pattern P for an individual preset shape S.

For illustrative purposes, some variations in the shapes S have been illustrated including some fanciful and severe distortions. The leading four preset shapes S are distorted in bow and skew. The second group of preset shapes S includes one shape having a flaw. The last group of four shapes S has a leading fiducial F which is non-periodic compared to the other fiducials.

As known from Sawatzky et al., to cut any shape, a pattern is characterized by a series of calculated cut lines along which the cutter is driven. Actual cutting can be optimized by calculating such cut lines on-the-fly. Accordingly, adapting to variable geometry of preset shapes S benefits from systems capable of real time scanning of sheet material 10 and recognition of fiducials F while performing optimization calculations so as to determine and implement the optimum cutting of the pattern P.

The sheet material 10 is moved continuously through the vision and cutting systems. The shapes S are preset in the moving material 10. The pattern P for the ideal geometry has been predetermined and is known. The location to which the pattern P will ultimately be applied to the sheet material 10 is initially an unknown. The vision system 12 provides this information through the identification of the coordinates of an associated fiducial. This one fiducial, which becomes a previous fiducial upon locating subsequent fiducials, enables determination of the preset shape S. The use additional subsequent fiducials enable determining distortion. The cutting system 11 is instructed regarding what particular pattern or geometry applies, and where and when to cut the pattern P so as to be superimposed with the preset shape S regardless of location in the sheet material 10 or distortion. The nature of cut-on the-fly operations already adapts to the cutting of moving material 10 and herein is further enabled with the ability to concurrently identify fiducials F while cutting of patterns P at coordinates dictated by the fiducials. In cut-on the-fly operation, most of the optimization calculations are performed real-time, at least to translate and rotate coordinates in response to relocating or positioning of the known pattern P. Accordingly, when one or more reference coordinates or fiducials of the preset shape S are known, the cutting pattern P is adapted in real time to be applied and cut precisely superimposed at the coordinates and geometry of the corresponding shape preset in the material.

To enable real-time performance in cut-on-the-fly operations, one cannot merely serially scan over sheet material 10 and later return to cut the previously scanned material as the sheet material has already moved on and out of the cutting zone of the cutting system. Limited only by computing capabilities, each of the preset shape locating and cutting operations are autonomous and operate simultaneously or concurrently. Such capabilities result from a vision system 12 located upstream of the cutting system 11.

Means are provided for processing the vision system information and for adapting the information to superimpose and cut a pattern to a preset shape with the cutting system. In one embodiment as shown, the vision system 12 has a controller 21 for processing the fiducial recognition system information, and determining coordinates x,y of the fiducials F relative to the cutting system 11. A global coordinate system is maintained in which the vision and cutting systems are known. The coordinates of the sheet material are also known in the global coordinate system as it moves therethrough. An encoder coupled to the means moving the sheet material relative to the vision and cutting systems provides the geometric relationship between coordinates on the sheet material as it moves in the global coordinate system between the vision system and the cutting system. Controller means 21, such as computer implemented software, determine the presence and coordinates of recognized fiducials F in the coordinate system of the cutting system 11 and interface the vision system 12 and cutting system 11 including communicating the information for recognized fiducials F to the cutting system 11. The cutting system 11 has its own controller means 22 for processing conveyor and positioner movement for ultimately cutting a pattern at the preset shape in the sheet material. The controller operations need not be physically separate but could also be handled by a consolidated controller or a supervisory controller.

Figure 4B:
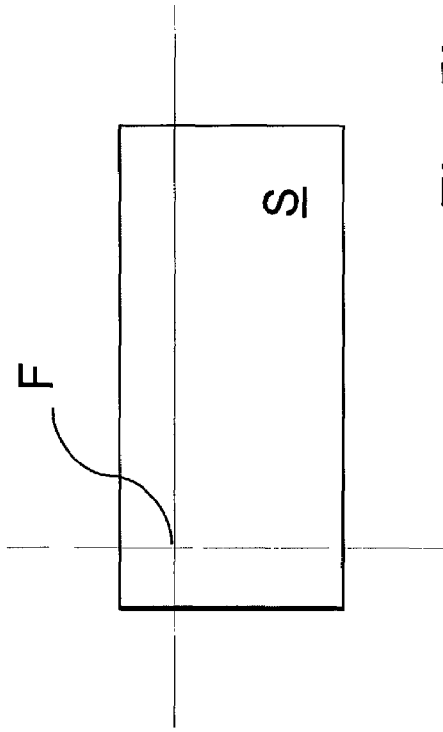
FIGS. 4a and 4b are plan views which illustrate several un-distorted rectangular shapes and some fiducial options.
Figure 4A:
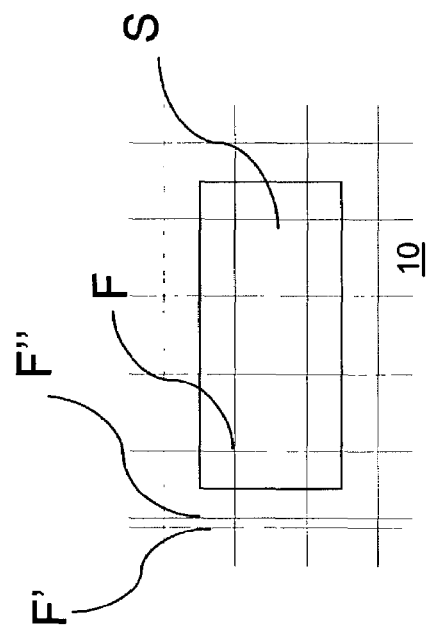

Referring to FIGS. 4a, 4b, as the material moves continuously past the vision system it locates a fiducial F or a unique sequence of fiducials F',F" related to a shape. In FIG. 4a a first fiducial F is illustrated by a dot already related to a rectangular shape S. In FIG. 4b, a series of cross-hair fiducials F',F" are illustrated; two in sequence may be indicative of an upcoming shape S, the next fiducial F or fiducials related to a rectangular shape S. A controller "pattern matches" the known pattern P and the recognized fiducials F. As previously described, the pattern P, known by controller means, can be cut from the moving sheet material 10 by locating and superimposing the pattern P with the fiducial F in the material and then cutting the pattern P so as to accurate cut the pattern preset shape S. As shown in FIGS. 5a; 5b, regardless of whether a subsequent shape (FIG. 5b) is shifted on the sheet material from a previous shape (FIG. 5a), the location of the fiducial F is known relative to the shape S itself and thus the pattern is properly positioned before cutting.

Practically however, and as illustrated in FIGS. 6, 7a–8b, the sheet material 10 itself can be distorted such as due to residual stresses in woven material or the moving sheet material 10 can additionally rotate, stretch, or further distort such as bow or skew after between the supply of the sheet material and the vision system 12, all of which jeopardize this ideal scenario of pattern and shape overlay or matching. It is useful to minimize further distortion between the vision system 12 and the cutting system 11 where there is no secondary system currently applied to monitor further distortion. In such cases the geometry of the predetermined pattern P no longer corresponds with the distorted preset shape S and matching errors upon cutting can occur unless the predetermined pattern is altered or remapped to better comply with the actual form of a distorted preset shape.

Figure 5B:
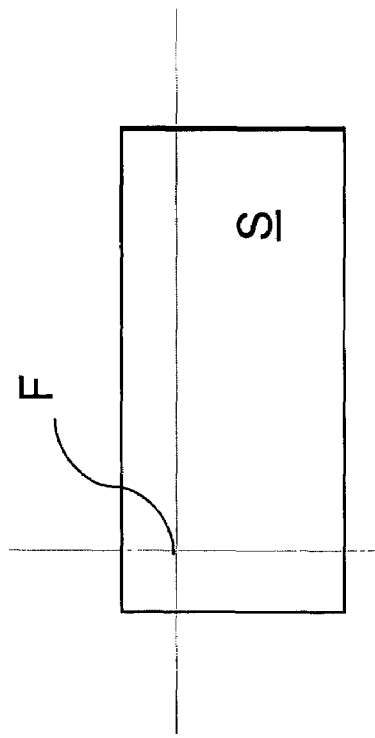
FIGS. 5a and 5b are plan views which illustrate two separate preset shapes which have identical patterns and shapes but which are relatively shifted transversely on the sheet material.
Figure 5A:
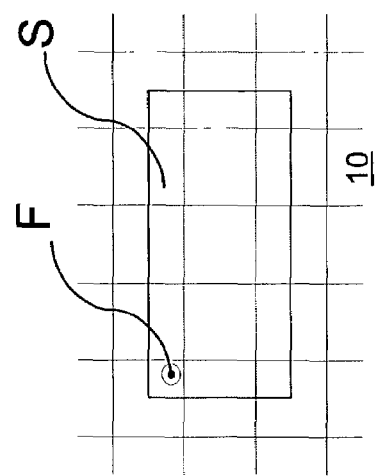
Figure 6:
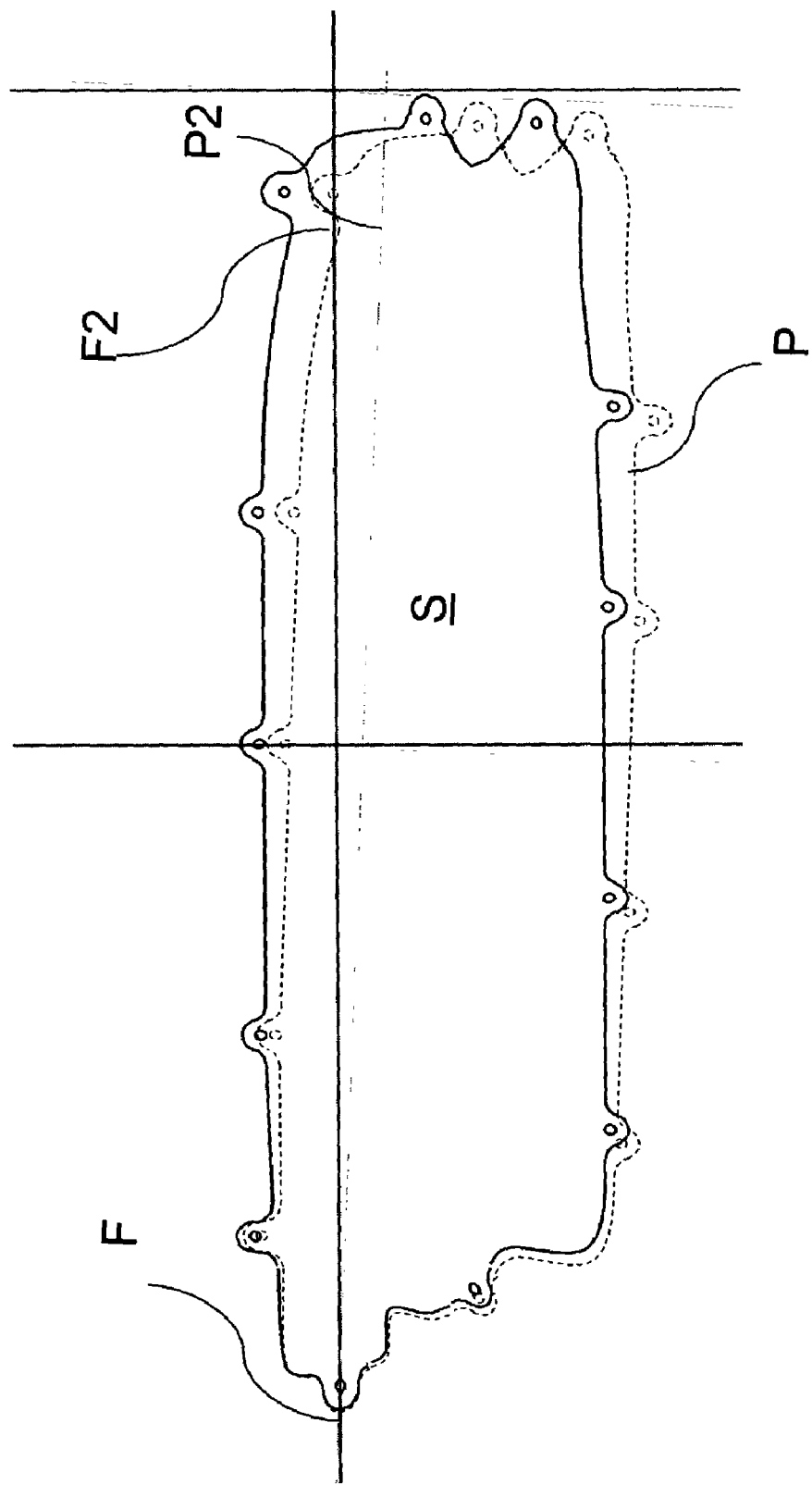
FIG. 6 is a plan view which illustrates a shape which is rotated from the ideal pattern (dotted lines) but otherwise not distorted.

A variety of cases can be broadly categorized as:

FIGS. 5a, 5b Stamp: In this scenario, the controller program does not need to alter the geometry of the pattern P at all. The vision system 12 need only locate the preset shape's corresponding fiducial F on the material 10, superimpose the pattern P and apply the pattern's cut lines as an overlay over the preset shape S and cut out the shape as would a stamp or cookie-cutter;

FIGS. 3, 6 Rotate: In this scenario, the program needs only to alter the geometry of the pattern P by mere rotation. The vision system needs two fiducials F,F2. A first reference fiducial F anchors the shape to the pattern P and a second fiducial F2 identifies a rotation of the material 10 and of the shape S from a characteristic point P2 of the pattern P and relative to the reference fiducial F.

Figure 7A:
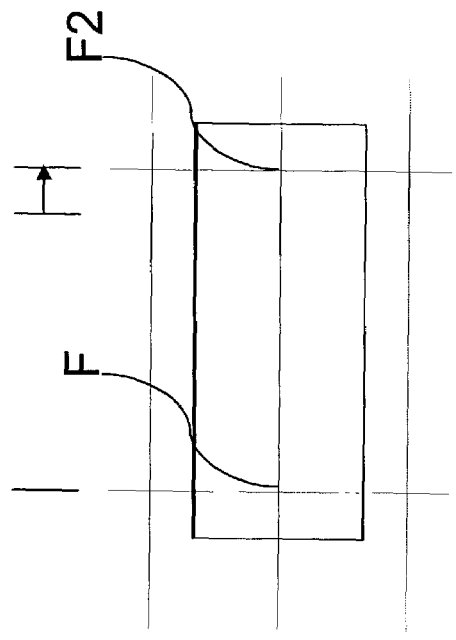
FIGS. 7a and 7b are plan views which illustrate two separate preset shapes the first of which is undistorted and the second of which is stretched longitudinally by an increment on the sheet material
Figure 7B:
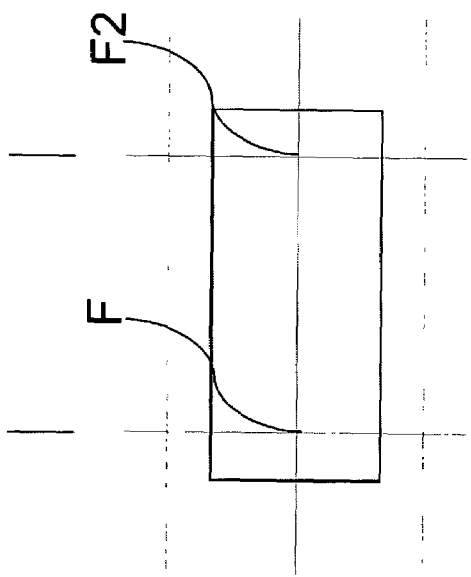

FIGS. 7a, 7b, Stretch & Shift: In this scenario, the program needs only to alter the geometry of the pattern P by mere geometric stretching (or compression) in X, Y or both. As shown in FIGS. 7a, 7b, a longitudinal stretch is identified using two or more fiducials F,F2 so as to define a reference length of the preset shape, F-F2, whether it be longer or shorter than the corresponding coordinates for the pattern, F-P2, and thus perform a "stretching" the pattern in the appropriate warp or weft direction and, as necessary, to perform a translation.

Other remapping scenarios can be applied to all or a portion of a shape S based on predetermined algorithms to account for critical areas of the shape which should not be remapped and others which can be remapped.

Figure 8A:
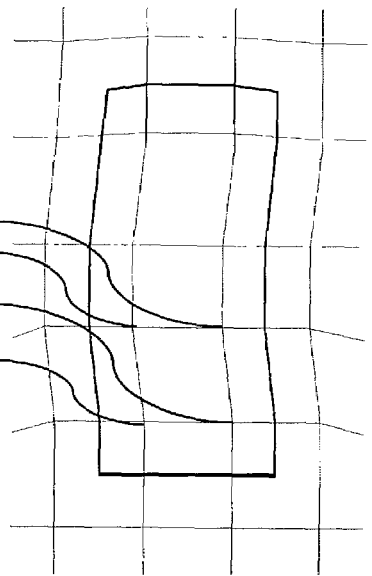
FIGS. 8a and 8b are plan views which illustrate two separate preset shapes in sheet material the first of which is undistorted and has a superimposed grid representing rectangular patches and second of which is distorted in both bow and skew as illustrated by the distorted patches.
Figure 8B:
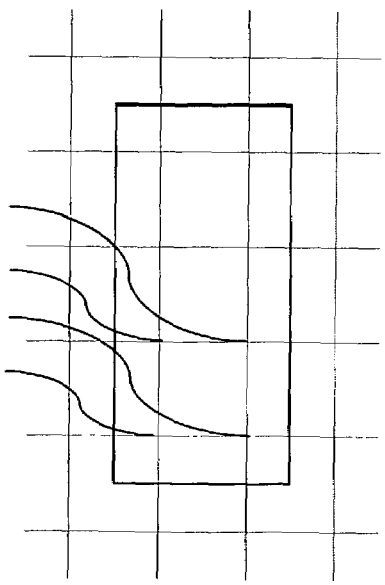
Figure 9A:
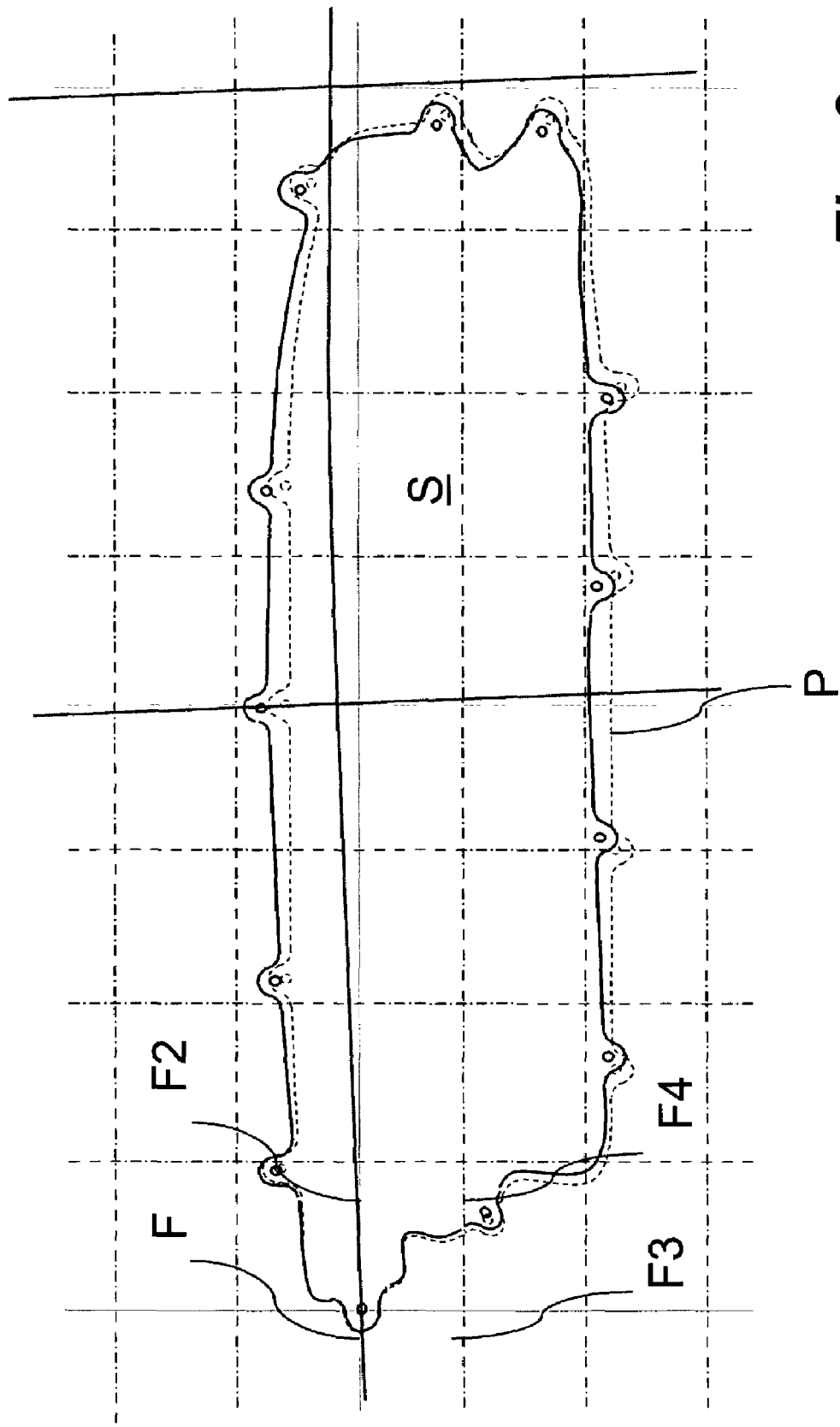
FIG. 9a is a plan view of a complex preset shape which is distorted in both bow and skew compared to the ideal pattern (dotted lines), grid lines and patches omitted for clarity.

FIGS. 8a, 8b, 9, Linear Bow & Skew: In this scenario, one or more areas or patches in the pattern P are defined bounded by at least three fiducials in an X,Y coordinate system. Multiples of three fiducials define triangular patches and multiples of four fiducials define a plurality of rectangular patches. The vision system determines bow and skew from the ideal pattern P. The program then needs only to re-map the pattern coordinates from the ideal pattern to a remapped pattern P which better reflects the bow and skewed area. Remapping can be applied to all or a portion of a shape S having two or more patches. Such a remapping process might be a simple linear translation of the coordinates or leaving a portion and modifying another portion. As shown, one embodiment implements one or more rectangular areas or patches bounded by at least four fiducials, two fiducials in X and two fiducials in Y.

Interpolated Bow & Skew: As before in linear bow and skew, and in this scenario, areas in the pattern P are defined such as a using rectangular patches bounded by at least two fiducials in X and two fiducials in Y. Once the vision system determines bow and skew, then the coordinates of the pattern P are corrected by interpolating using an $N^{th}$ degree polynomial to smooth the cutting for all points.

Figure 10:
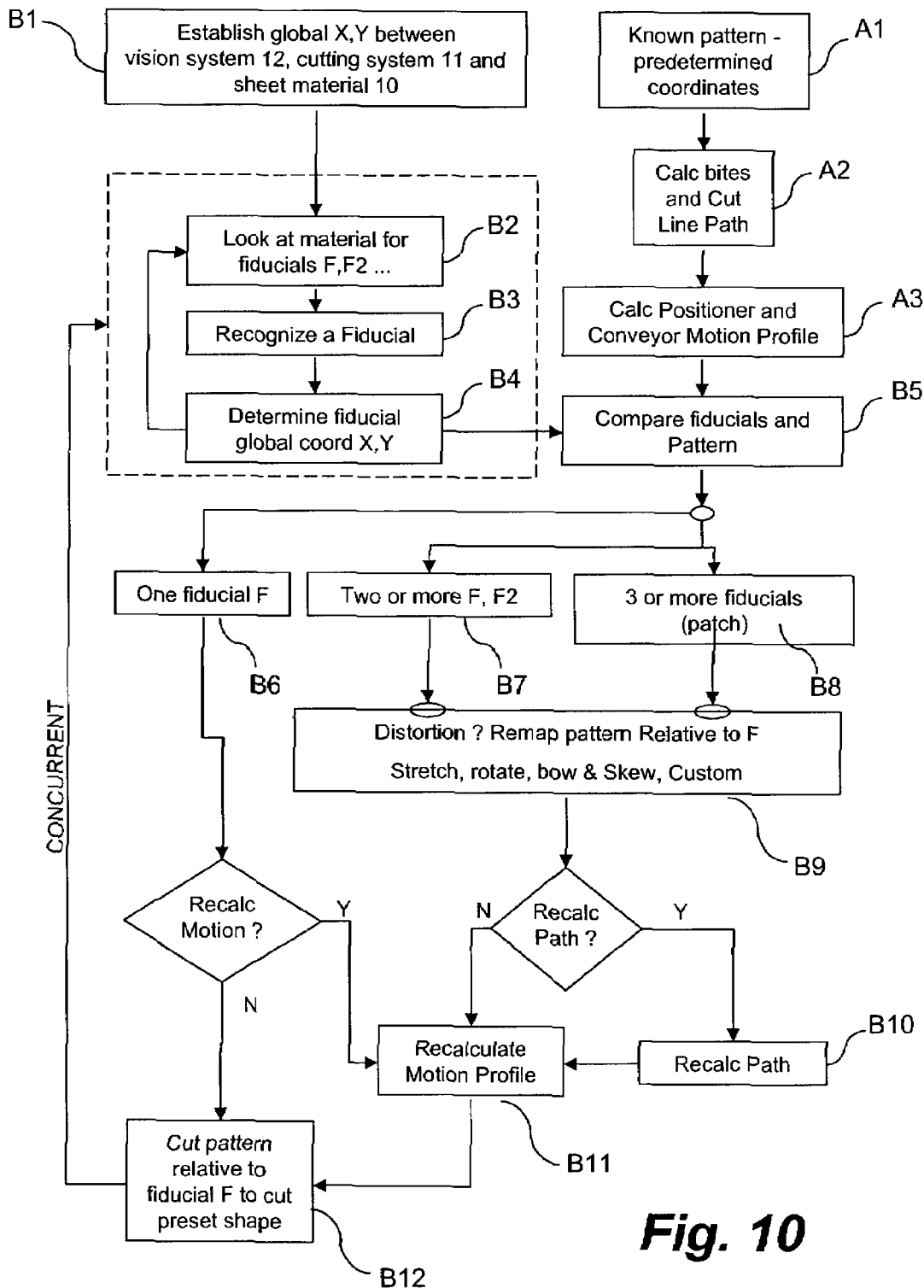
FIG. 10 is a flow chart of a process for cutting shapes preset in sheet material and which illustrate several options to adapt to various material movement and distortion.

Accordingly generally, in operation, and referring to Block B1 of FIG. 10, the relative geometry between the vision system 12 and the cutting system 11 is determined for placing the sheet material 10, the vision system 12 and the cutting system 11 in a global coordinates system.

The vision system 12 is located at known coordinates X,Y upstream of the cutting system 11. The conveyor 16 has known speed characteristics. A calibration is performed between the coordinates of a fiducial F at an origin point and the actual cutter 13 of the cutting system 11. Such a calibration is typically predetermined as required, such as at the beginning of a roll of sheet material 10. The origin is identified and the operator advances the material until the origin is visually positioned under the cutter. All relative coordinates are thereafter known in the global coordinate system. Cutting can then commence according to the pattern and substantially continuously thereafter and concurrently which the location of fiducials F.

The pattern has predetermined coordinates which are typically known before the process begins at Blocks A1,B1. Using the pattern, one can calculate at Block A2 the cut line path and bites suitable for the cutting system. The motion profile can be calculated at Block A3. The cut lines and motion profile may or may not need to be changed on-the-fly The conveyor 16 is operated and a process of concurrent location of fiducials and cutting shapes commences. At Block B2, the vision system 12 looks substantially continuously at a width of the sheet material 10 passing thereby for seeking one or more fiducials F, F2 . . . . An effective width is selected within which fiducials appear, practically being somewhat less than the entire transverse width of the sheet material. As is known by those skilled in the art, various rules can be applied for determining if a candidate recognized by the vision system 12 at Block B3 qualifies as a fiducial including inherent vision-based detection thresholds. For minimizing the processing overhead, and minimizing the incidence of false positives, the vision system can be instructed to only watch a subset of the transverse width, limiting the effective to one or more regions of interest.

The global coordinates x,y of each fiducial are forwarded to means for comparing the pattern and the fiducials at Block B5. The vision system 12 recognizes and determining fiducial coordinates concurrently and thus regardless of the downstream activity such as the operation of the cutting system 11. For convenience and to distribute the computing burden, the vision system 12 controller processes incoming data such as coordinates x,y independently from the controller 22 processing instructions performed by the cutting system 11.

The sheet material 10 is moving and thus the coordinates of the fiducials F,F2 . . . are also moving. Using any of a variety of computation techniques including moving arrays of coordinates or time and space calculations, the fiducials F,F2 . . . are tracked in the global coordinate system of the cutting system 11.

At Blocks B6,B7,B8, the location of the shape S is determined with a minimum of one fiducial F and can also adapt to correct distortion of the shape using two or more fiducials F,F2,F3 . . . . This adjustment is accomplished on-the-fly by matching recognized fiducials F with a digital template of the pattern P and then making adjustments as desired to the pattern's geometry for achieving the desired accuracy of cutting of the preset shape S.

In a simplest implementation at Block B8, one fiducial F is found and thus the location of the preset shape is known and, at Block B12, the corresponding pattern is applied relative to the location of the fiducial F to cut the preset shape S. If there is a translation required, the motion profile may be recalculated at Block B11.

In other implementations, the patterns may be characterized by two or more fiducials F,F2. In these embodiments,) one applies additional methodology to accommodate distortions from the pattern's ideal or predetermined geometry as described above.

At Block B7, the vision system 12 recognizes a first fiducial F for a known pattern and which locates the preset shape S in the sheet material. The vision system identifies and reports at least one additional fiducial F2 which the controller compares with the pattern P to identifies the nature of any distortion. If found, then the pattern P is remapped according to the nature of the distortion before proceeding to the cutting of the distorted preset shape at Block B12.

At Block B12 the preset shapes S are cut based on the one or more previous fiducials. The pattern, as originally defined or remapped, is superimposed on the sheet material based on the predetermined coordinates of the pattern applied at the global coordinates of the fiducial. While the cutting system 11 is proceeding based on previous fiducials, the vision system 12 is simultaneously or concurrently locating one or more subsequent fiducials in the moving sheet material;

Typically the motion profile Block B11 recalculated. Dependent upon the extent of the distortion, the cut lines or path may also need to be recalculated for optimally driving the culling system 11. One case which can provide enough distortion information and thereby benefit from recalculated cut lines is a bow and skew scenario.

At Block B9 and generally driven by the complexity of the pattern, the vision system expects to find a plurality of additional fiducials F2,F3 . . . Fn which define patches. Distortion is discretized and reflected in distortion of each patch. A distorted shape is remapped by remapping each patch. Then the cut line path may be recalculated at Block B10 and the motion profile is recalculated at Block B11 before proceeding to the cutting of the distorted preset shape at Block B12.

Use of patches enables variable remapping within a shape. Triangular patches are defined by three fiducials per patch and adjacent triangular patches share two fiducials. Accordingly, two or more patches require 2+1n fiducials, where n represents the number of patches. Similarly, rectangular patches require 2+2n fiducials. Other polygonal shaped patches may be used. A variety of remapping algorithms can be used depending upon the patch geometry and the type of remapping desired. In a simple case, an ideal patch may be rectangular (x0,y0–x3,y3) and which may become distorted into a four sided polygon (x'0,y'0–x'3,y'3). Each patch can have the same or a unique mapping function. In such a case, each point is translated from a rectangular to the non-rectangular patch. In a linear bow and skew analysis, one mapping function can be x'=Ax+By+Cxy+D and y'=Ex+Fy+Gxy+H. Four equations can be written for four unknowns and one can solve for A,B,C,D. Similarly, one can solve for E,F,G,H. Making some assumptions simplifies the solution.

As shown in FIGS. 9b–9d, for a plurality of rectangular patches, adjacent patches have pairs of fiducials having the same x coordinates and pairs of fiducials having the same y coordinates. Further, one may assume an origin fiducial x0,y0 of the first patch is the same as the distorted patch x'0,y'0. Now, the equations can be solved directly. For cut-on-the-fly considerations, it is useful to place bite boundaries on patch boundaries.

Figure 11:
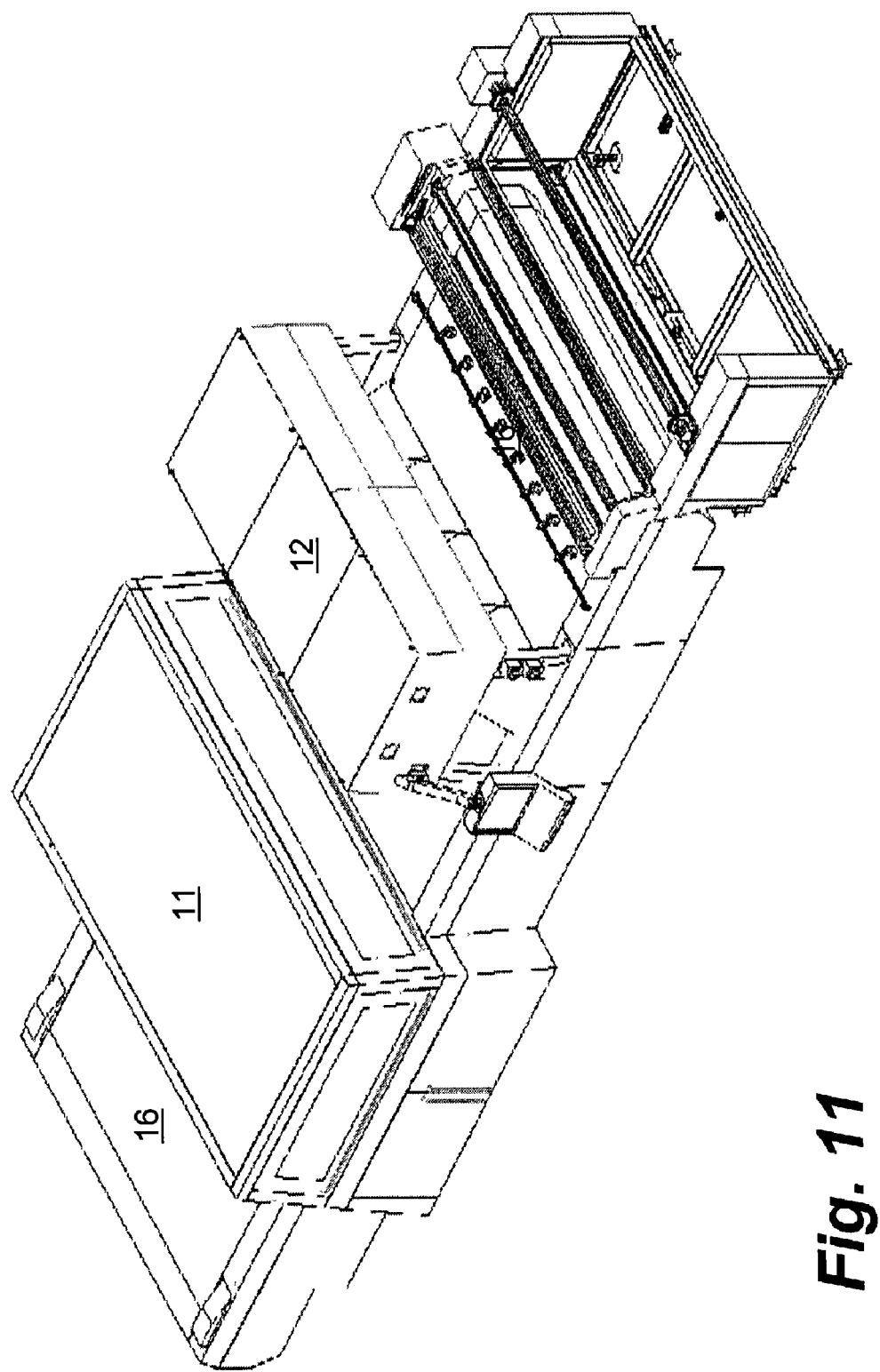
FIG. 11 is a perspective view of one embodiment of the invention adapted to a commercial laser cutting system according to the Lacent 1000 example.

Referring to FIG. 11, with these basic principles in mind, and in a practical illustrative embodiment, the cutting system 11 can comprise a standard laser cutter, model Lacent 1000 from Lacent Technologies Inc., Edmonton, Alberta Canada, configured and operating substantially as that disclosed in U.S. Pat. No. 6,294,755. Among the variations from the apparatus set forth in U.S. Pat. No. 6,294,755 is that the cutting system is equipped with a Rofin-Sinar 1000 watt, sealed laser. The Lacent 1000's cutter positioning system is capable of traveling at velocities of up to 1500 mm/second with accuracy better than ½ mm. The positioner carrying the laser cutter is controlled with at positioner motion controller (PMC or PMAC). The conveyor's bed is capable of traveling at velocities up to 130 mm/second. The conveyor 16 is controlled with a conveyor motion controller (CMC). Finished sheet material has a maximum width of 2.4 meters and is typically supplied on rolls weighing up to 1400 Kg.

Figure 12:
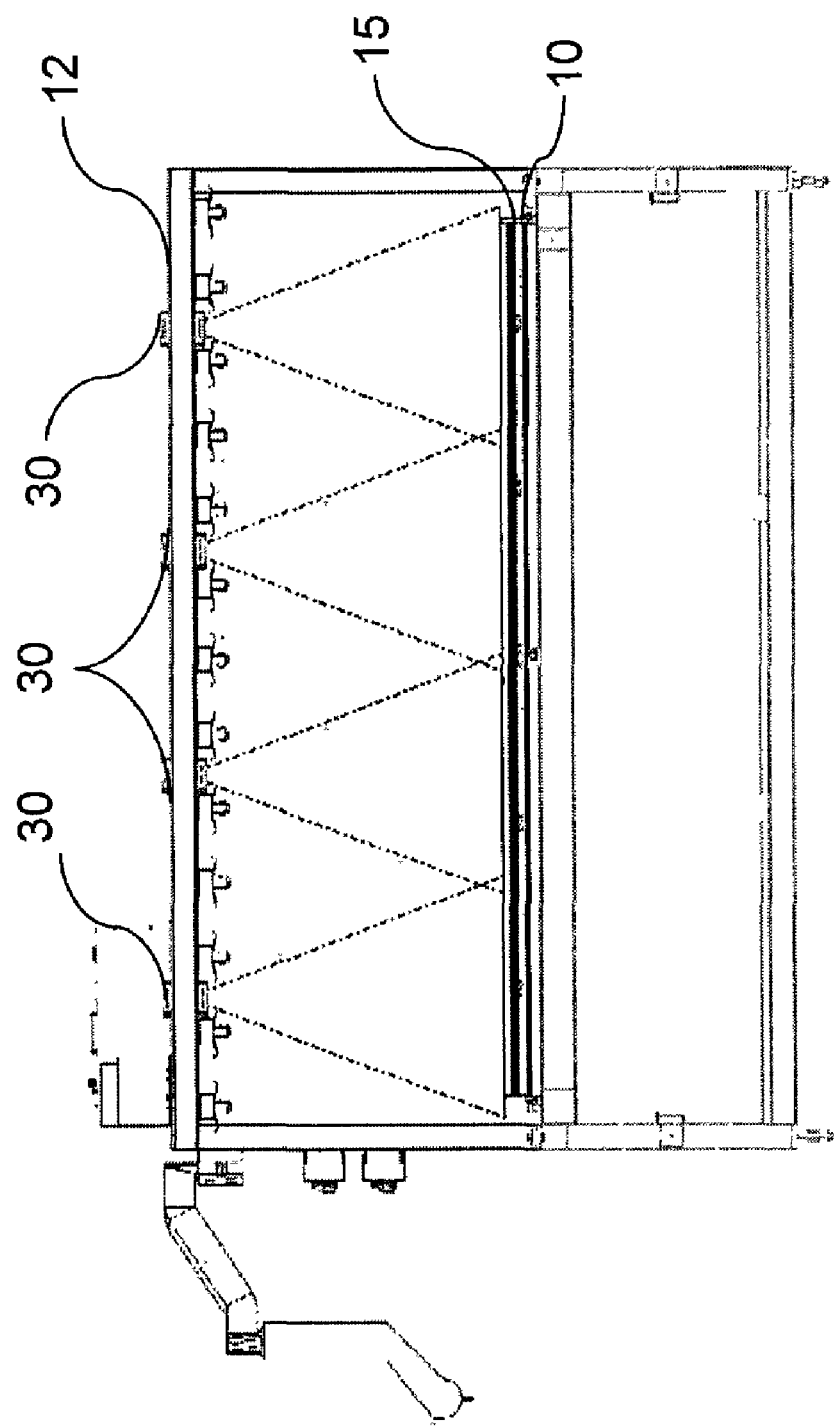
FIG. 12 is an end view of the vision system according to the embodiment of FIG. 11.

As shown in FIGS. 2a, 2b and 12, the cutting system 11 is adapted with a camera-based vision system 12 capable of contrast detection of up to six fiducial marks spaced transversely over an effective material width of 2.6 meters. The vision system comprises an array of four cameras 30,30,30, 30 each covering a region of approximately 0.65 by 0.5 meters. Four cameras as a cluster therefore cover the effective width of 2.6 meters by 0.5 meters long. Special ballasted low maintenance fluorescent lighting aids the cameras and the vision processing system by providing flicker-free lighting.

The system 12 determines the location of each fiducial F with an accuracy of better than 2 mm as the sheet material 10 moves continuously but not necessarily uniformly beneath it into the cutting system's cutting zone. Using cameras 30, such as those by Sony having 600×800 pixel resolution and non-interlaced 60 Hz capture rates, and at conveyor speeds of 5 inches per second (130 mm/s) the motion blur is better than 1/12 of an inch (2 mm). As set forth in the illustrative embodiment, it has been found that preset shapes up to 2.8 meters in width moving at 130 mm/second can be accurately tracked within a 10 mm seam allowance of the pattern.

Six sets of transversely spaced fiducials F may be processed every ½ meter moved with material moving up to 130 mm/second. This accommodates more than one fiducial per preset shape allowing the system to compensate for "bow & skew" scenarios. Limited only by the physical size of the example Lacent 1000 cutting system only, the patterns may be up to 3 meters in length. Sheet materials successfully cut using the present system include silicon coated nylon with a fabric weight of 700 g/m$^2$ (20.7 oz).

The vision system is capable of detecting, distinguishing or recognizing and locating the coordinates of one or more fiducials in the material. As shown a set of 6 transverse fiducials can be located and subsequent sets can be detected as the sheet material 10 passes under the visions system 12. The vision system 12 processes incoming data independently from the Lacent 1000 laser cutting system. The vision system detects cross hair fiducials F placed on or in the sheet material. The discrete coordinates of a fiducial on the sheet material 10 are known in the coordinate system of the cutting system 11. As the material traverses the vision system, material position indications are received from time to time and matched to the fiducials are recognized. More so for the convenience of a human operator, a system encoder is interfaced to a Pentium-based computer for providing position indications which appears in a monitoring widow of the vision system. A 48 bit encoder can provide opto-isolated differential 0–5V quadrature signals at 4000 pulses per inch, which at 5"/s is 20,000 pulses per second. The fiducial coordinates are also passed as a digital string via an RS-422 serial communications interface to the cutting program. A timing strobe is provided to provide synchronization accurate to a millisecond indicating the moment in time at which the positions and coordinates were valid.

The lighting and cameras 30 are mounted upstream and adjacent to the cutting zone of the cutting system 11. The images from the camera clusters 30,30,30,30 are processed by an image processing system. The image processing system interfaces to an operation via an interface such as a Pentium-based (Intel Corporation) computer. The vision system software is capable of real time operation with material motion at continuous and at continuously variable rates of up to 130 mm per second.

Figure 13:
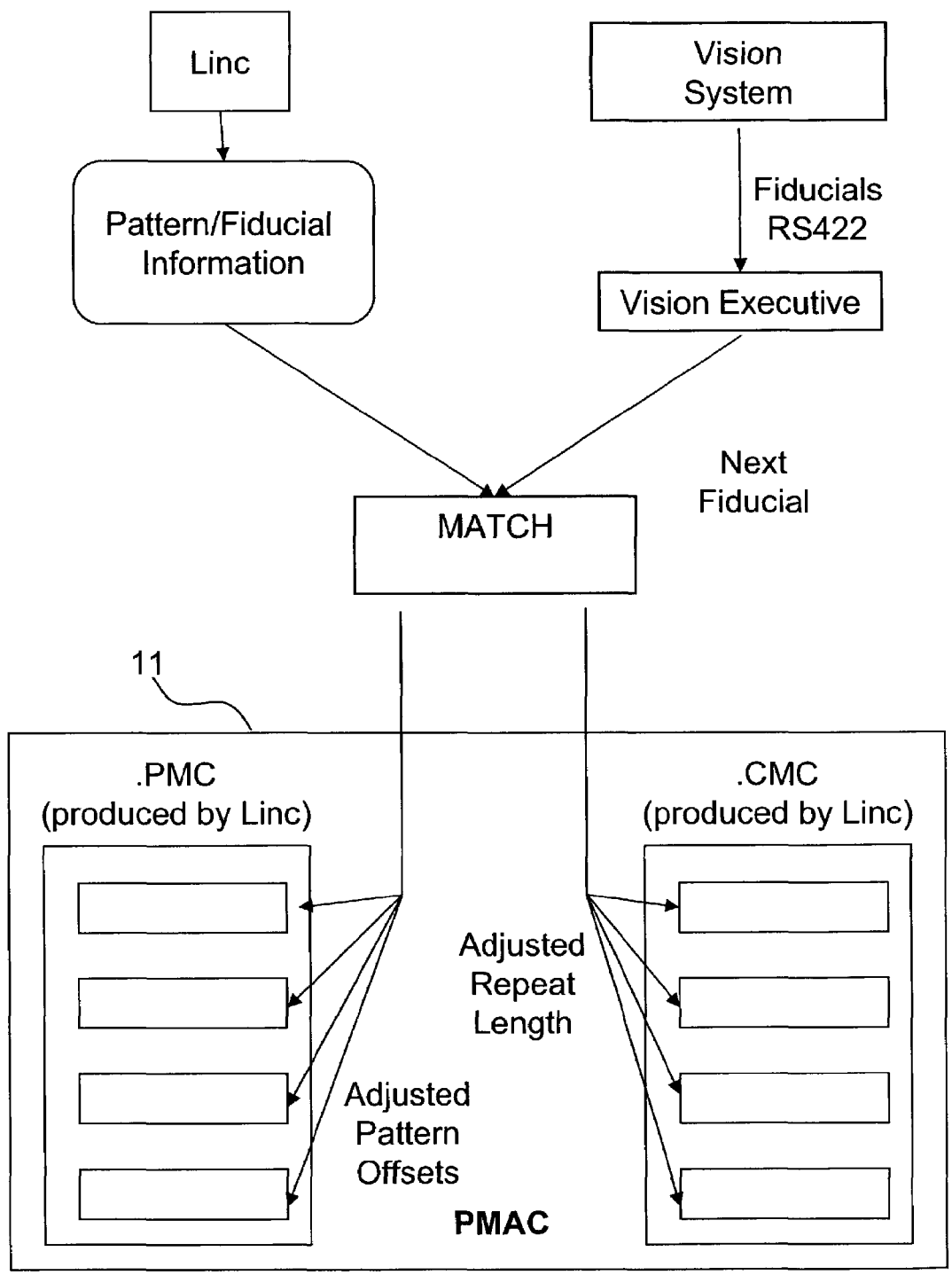
FIG. 13 is a schematic of the vision system cooperating with the cutting system to adjust motion control of the PMC and CMC.

With reference to FIG. 13, the, the vision system's cameras are immobile and look or stare at the effective width of the sheet material as it passes by. The vision system is controlled by a vision executive or program which receives fiducial information from the vision system via an RS-422 link and then manages the one or more fiducials in a queue. Each fiducial is analyzed by matching the fiducial information against a digital template of the pattern. Through information exchange and cooperation, the vision system and cutting system, as necessary, remap the pattern geometry and calculate new cut lines for instructing the positioner PMC and the conveyor CMC on-the-fly., and then. Multiple fiducials enable detection of distortion in the sheet material.

Figure 14:
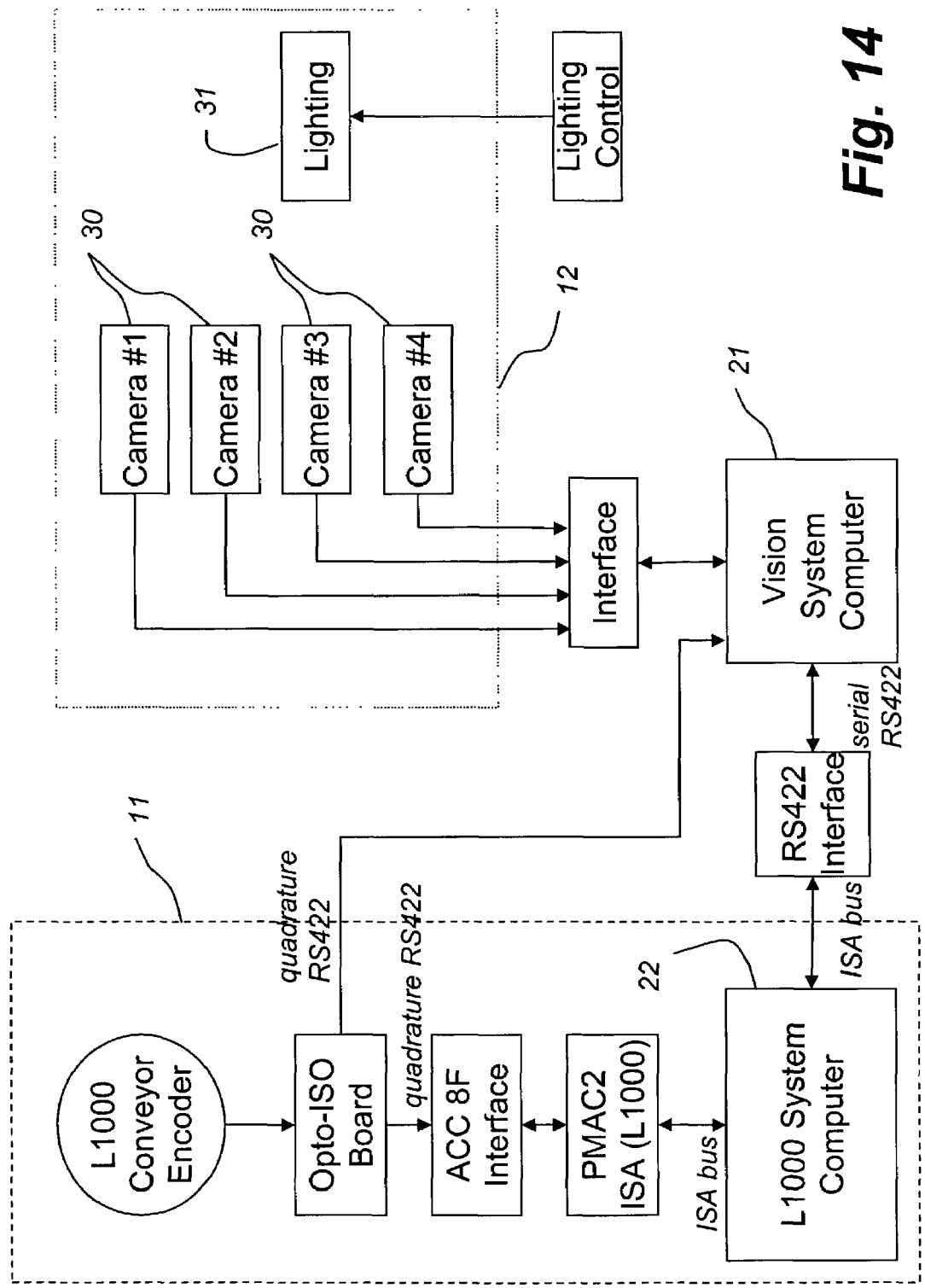
FIG. 14 is a block flow block diagram of the hardware connections between the vision system, the cutting system and their respective controllers.

As set forth in FIG. 14, the vision system 12 comprises cameras 30 and lighting 31 coupled through an interface to the vision executive or controller 21. The vision system 12 also communicates with the cutting system 11 in several aspects: one to receive and maintain a relationship between the cutting system's encoder and possibly to receive correction or reset information therefrom; and to communicate with the cutting system controller 22 for providing fiducial coordinate information. The cutting system maintains control of the real-time movement of the material and the preset shape in the global coordinate system through the encoders and motion controllers.

The vision system 12 can be tuned knowing basic characteristics of the sheet material so as to adapt to different fiducials and distinguishing the fiducial from visual background noise.

The known pattern P of the preset shapes S are stored in the memory of a computer system operating appropriate programs for performing real-time optimization of cut lines, and for performing translation and rotation of the pattern's coordinates. The pattern is typically stored as a vector file referenced to an origin, an example of such being an AutoCAD drawing file or Drawing eXchange Format (DXF) file. The vision system captures and analyzes images being taken by at least one camera. The cameras are connected to a computer system which performs the detecting analysis. The co-ordinates of the cameras 30 are in a frame of reference relative to the coordinates of the laser cutting system 11. Accordingly, a located fiducial F is known in a coordinate system of the cutter 13 of the cutting system 11.

Accordingly, while the cutting system 11 is cutting a previously located preset shape in the continuous stream of sheet material 10, the vision system 12 is simultaneously determining the reference coordinates of the next shape S. Each time a shape passes under the vision system, the cutting system is updated as to the global coordinates of the approaching shape.

This embodiment is typically calibrated before first operation as follows: The operator first advances the sheet material to the vision system 12 and verifies the location of the very first fiducial or origin mark recognized thereby. Error handling for missed or unexpected fiducials and an operator interaction may be required at in the first instance. The operator acknowledges the identified coordinates of the fiducial as a calibration origin. The conveyor and sheet material are advanced to the cutting system 11 so as to align the origin with the cutter 13.

The system identifies a "pattern" and related fiducial information which are conveniently stored in a computer-aided drawing CAD file, such as would be output from a CAD program AutoCAD, available from Autodesk Inc., Cupertino, Calif. in an AutoCad DXF format. A program "Linc" is used to process the known pattern geometry and further: imports pattern and fiducial information from the DXF file; exports pattern fiducial locations; exports pattern information associated for all cut line vectors; accepts a material type for each pattern; and inserts offset correcting code into the PMAC and CMC.

A supervisory motion controller runs in either the prior art mode so as to apply pattern cutting regardless of material or in vision mode which applies the apparatus and methodology of the present invention which is aware of preset shapes in material. In vision mode, the motion controller manages many aspects of the operation including: tracking vision system offsets; instructs the vision system what material type profile to use; accepts unsolicited fiducials from the vision system; continuously match fiducials to the pattern's digital template; remaps or adjusts for each pattern and downloads the remapped patterns to PMAC; calculates adjusted marker length for download to PMAC; allowing operators to indicate marker origin on the very first instance or on error to produce a fiducial map; and permitting various operator feedback capability.

As stated above and as set forth in greater detail in U.S. Pat. No. 6,294,755 to Sawatzky et al., increased throughput is achieved through optimization of the movement of a tool which can involve high velocity and accelerations and, accordingly, the X-Y positioner for the tool must be capable of high acceleration and precise movements.

The parts of a pattern P have generally already been pre-fitted into the nest (FIG. 3). The nest is a plurality of shapes laid out in a collection or grouping so as to minimize material waste. A bite length or width is determined which is machine dependent and is generally less than the length of a nest. It is necessary to calculate a bite because the longitudinal length of a pattern P or nest may not fit within the cut zone the cutting system 11. A bite is approximately ½ the length of the longitudinal length of the cut zone of the system 11. For example a 44 in. cut zone may only provide a 22 in. bite.

A digital motion controller and computer process the cutting system's X1, X2 and Y positioner encoders and conveyor movement information. The computer processes the pattern information and outputs optimized cut moves to the PMC and the CMC. The motion controller outputs commands to drive the linear motors for the positioner and drive for the conveyor to coordinate the motion of laser nozzle 13 on the X-Y positioner and the speed of the conveyor. A process takes the pattern geometry and optimizes the movement of the laser nozzle over the sheet material 10.

Figure 15:
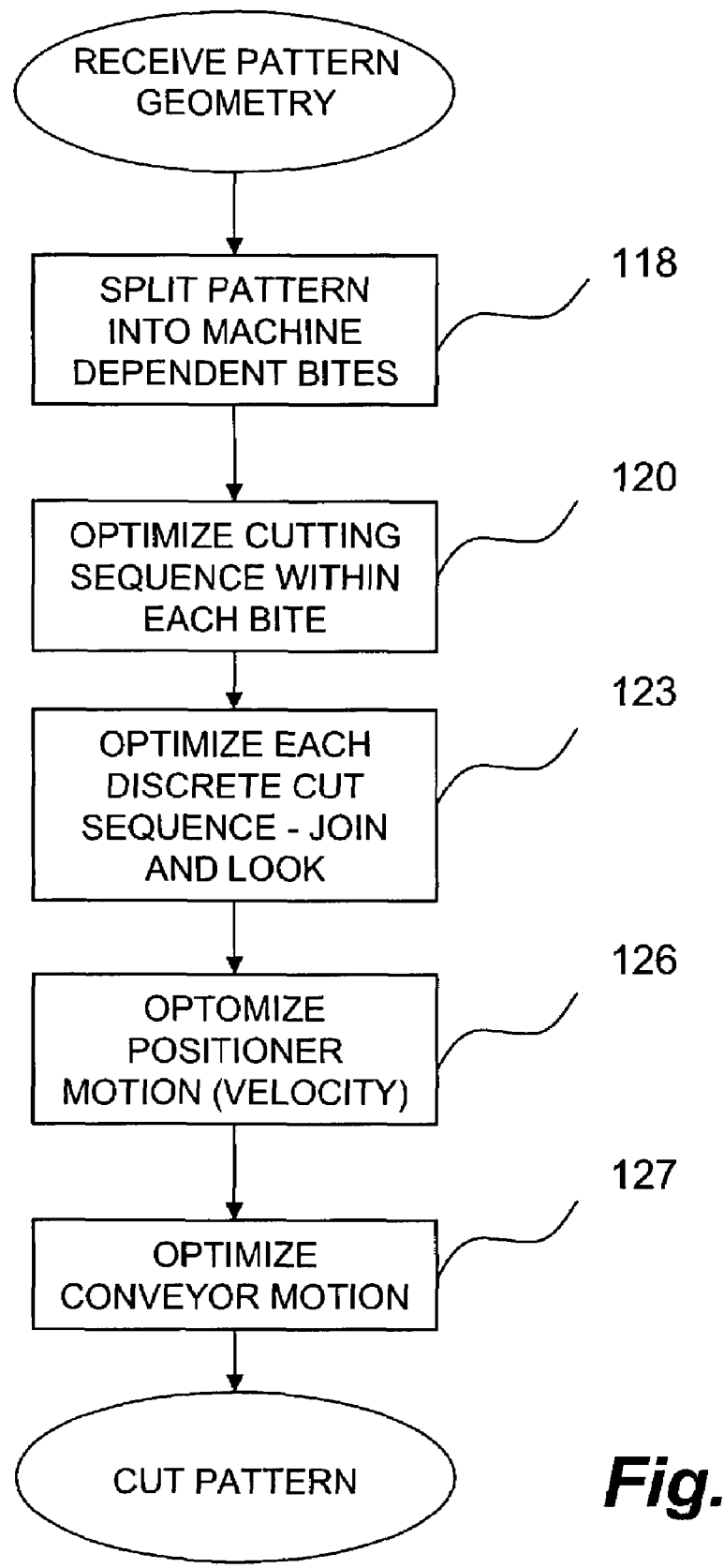
FIG. 15 is a flow diagram of one calculation sequence for determining the cut line paths and motion control.

In overview, and referring to the flow chart of FIG. 15, after the geometry of a pattern P, or remapped pattern, is received:

(a) at block 118, the geometry is organized into machine dependent bites which fit within the cutting zone 11;

(b) at block 120, the cutting sequence across width of the bite is optimized. As a result, geometry is established as a series of continuous cuts separated by dry hauls;

(c) at block 123, the geometry of the continuous cuts is optimized into a plurality of discrete moves by minimizing the number of non-tangent intersections forming new moves, and thus minimizing inefficient stop and go actions within the continuous cut;

(d) at block 126, the positioner motion profile is determined by optimizing the velocity profile of each discrete move, all the while being cognizant of system constraints. Curved moves are also referred to generically as moves or as curves; and finally (e) at block 127, the conveyor motion is optimized for maintaining piecewise continuous, forward velocity, even between bites and velocity is not permitted to become negative.

The resulting geometry is stored and the optimized moves are sent through the motion controllers CMC, PMC for driving the conveyor 16 and positioner for cutting the pattern P superimposed over the preset shape S in these embodiments.

With respect to optimization, by looking ahead to the next move, one can optimize the movement of the laser nozzle. The objective of this "Look ahead" process is to minimize the time that is required to follow any arbitrary geometry or pattern P while avoiding exceeding specified maximum acceleration's and velocities or drifting outside dimensional tolerances.

The embodiments of the invention which an exclusive property or privilege is claimed are defined as follows:

1. A method of cutting out one at least one shape (S) preset in sheet material (10), the at least one preset shape (S) having a pattern (P) with predetermined geometry and having at least one fiducial (F,F2 . . . ), each of the at least one fiducial (F,F2 . . . ) corresponding to predetermined coordinates in the pattern (P), comprising:
   locating the global coordinates of located one or more fiducials (F,F2 . . . ) corresponding to a located shape (S) of the at least one shape (s) with a vision system (12) while the sheet material (10) moves relative to the vision system (12) and relative to a cutting system (11);
   cutting the pattern (P) for the located shape (S), the pattern (P) being superimposed relative to the located one or more fiducials (F,F2 . . . ), while concurrently locating the global coordinates of subsequent one or more fiducials (F,F2 . . . ) for at least a subsequent shape (S) in the moving sheet material (10); and
   substantially continuously repeating the concurrent processes of cutting the located shape (S) while locating the global coordinates of subsequent one or more fiducials (F,F2 . . . ) for the at least one subsequent shape (S).

2. The method of claim 1 wherein the vision system and cutting system are fixed and the sheet material is moved substantially continuously past the vision system and then past the cutting system.

3. The method of claim 1 further comprising:
   establishing measures of the relative movement of the sheet material and the vision and cutting systems; and
   tracking the movement of the at least one fiducial between the vision system and the cutting system knowing the measures of relative movement.

4. The method of claim 1 wherein the at least one preset shape is a plurality of shapes associated with at least one fiducial.

5. The method of claim 1 wherein each of the at least one preset shape is associated with at least one fiducial.

6. The method of claim 1 wherein the at least one fiducial comprise a first fiducial and at least a second fiducial, further comprising:
   comparing the pattern end the global coordinates of the at least a second fiducial relative to the first fiducial for establishing a distortion of the at least one preset shape; and
   remapping the pattern so as to substantially correct for the distortion of the at least one preset shape before superimposing the remapped pattern for cutting the sheet material.

7. The method of claim 6 wherein the remapping is applied to the whole of the pattern or a portion of the pattern.

8. The method of claim 6 wherein the remapping of the pattern corrects distortion of the at least one preset shape selected from the group of stretching, rotation or both a rotation and a stretching.

9. The method of claim 6 further comprising:
   controlling a cutter of the cutting system with a motion profile;
   predetermining the motion profile for the pattern; and
   modifying the motion profile according to the remapped pattern before applying the superimposed remapped pattern for cutting the sheet material.

10. The method of claim 9 further comprising:
    predetermining a outline path for the pattern;
    modifying the predetermined cut path for the remapped pattern; and
    modifying the motion profile according to the modified cut line path before applying the superimposed remapped pattern for cutting the sheet material.

11. The method of claim 10 further comprising:
    identifying a flag fiducial from the at least one fiducial as being indicative of a change in at least a portion of a pattern associated with the flag fiducial;
    modifying the cut line path to account for the change in the pattern; and
    modifying the motion profile according to the modified cut path before applying the superimposed remapped pattern for cutting the sheet material.

12. The method of claim 11 wherein the flag fiducial is indicative of a flaw in one of the one or more preset shapes, the pattern being changed to omit the flawed preset shape.

13. The method of claim 6 wherein at least three fiducials of the at least one fiducials are located for the preset shape according to the relationship of 2+1n, where n=1 or more, wherein each three fiducials form a triangular patch, further comprising:
    establishing one of the at least one fiducial as a reference fiducial;
    comparing the pattern and the global coordinates of the each three fiducials in a triangular patch relative to the reference fiducial for establishing a distortion of the triangular patch within the preset shape; and
    remapping the pattern corresponding to the triangular patch so as to substantially correct the pattern for the distortion before applying the superimposed remapped pattern for cutting the sheet material.

14. The method of claim 6 wherein at least four fiducials of the at least one fiducials are located for the preset shape according to the relationship of 2+2n fiducials, n=1 or more, wherein each four fiducials form a rectangular patch, further comprising:
    establishing one of the at least one fiducial as a reference fiducial;
    comparing the pattern and the global coordinates of the each four fiducials in a rectangular patch relative to the reference fiducial for establishing a distortion of the rectangular patch within the preset shape; and
    remapping the pattern corresponding to the rectangular patch so as to substantially correct the pattern for the distortion before applying the superimposed remapped pattern for cutting the sheet material.

15. The method of claim 1 wherein the preset shape is woven into the sheet material.

16. The method of claim 1 wherein the vision system comprises one or more cameras, further comprising staring at a width of the sheet material with the one or more cameras for locating the at least one fiducial.

17. The method of claim 16 wherein the width is one or more regions of interest as subsets of a transverse width of the sheet material.

18. The method of claim 16 further comprising detecting a change in contrast between the at least one fiducial and the sheet material.

19. The method of claim 1 wherein the cutting system comprises a cutting zone known in a global coordinate system and a controller for storing a pattern of the geometry of the at least one preset shape to be cut out of the sheet material, further comprising:
   positioning the vision system at known global coordinates upstream of the cutting system for looking at the sheet material;
   moving the sheet material substantially continuously past the vision system for locating the at least one fiducial in global coordinates;
   moving the sheet material substantially continuously past the cutting system while the vision system concurrently detects the subsequent at least one fiducial in global coordinates; and
   cutting the pattern when the controller determines that the global coordinates of one of the located at least one fiducial are within the cutting zone so as to accurately cut the pattern superimposed with the preset shape.

20. Apparatus for cutting out a shape preset (S) in sheet material (10), comprising:
   a cut on-the-fly cutting system (11) for cutting a pattern (P) in the sheet material (10), the cutting system (11) being known in global coordinates;
   a vision system (12) for locating global coordinates of at least one fiducial (F,F2 . . . ) in the sheet material (10) which correspond with predetermined coordinates in the pattern (P);
   structure (16, 11, 12) for effecting relative movement substantially continuously between the sheet material (10) and the vision and cutting systems (12, 11);
   means (22, 16) for establishing measures of said relative movement in global coordinates; and
   a controller (22) for superimposing the pattern (P) with the located at least first fiducial (F,F2 . . . ), so that the cutting system (11) cuts the pattern (P) for the preset shape (S) substantially concurrently while the vision system (12) locates global coordinates of subsequent at least one fiducial (F,F2 . . . ) in the sheet material (10).

21. The apparatus of claim 20 wherein the vision system and the cutting system are fixed in the global coordinates, the structure for effecting relative movement further comprising a conveyor for moving sheet material substantially continuously from the vision system to the cutting system.

22. The apparatus of claim 20 wherein the means for establishing measures of said relative movement comprises a device for tracking movement in global coordinates of the sheet material as it moves.

23. The apparatus of claim 20 wherein the controller compares the pattern and the global coordinates for at least two fiducials of the located at least one fiducial or more fiducials with the pattern for identifying distortion in the preset shape and remaps the pattern to so as to substantially correct the pattern for the distortion of the preset shape before superimposing the remapped pattern for cutting the sheet material.

24. The apparatus of claim 20 wherein the vision system is one or more cameras arranged for staring at a width of the sheet material.

25. The apparatus of claim 20 wherein the cut-on-the-fly vision system is a laser cutting system.

* * * * *